(12) United States Patent
Chan

(10) Patent No.: US 6,955,442 B1
(45) Date of Patent: Oct. 18, 2005

(54) HINGEDLY ARTICULATED MAGNIFYING DEVICE

(75) Inventor: Sik-Leung Chan, New Territories (CN)

(73) Assignee: C. C. & L Company Limited, Tsuen Wan (CN)

( * ) Notice: Subject to any disclaimer, the term of this patent is extended or adjusted under 35 U.S.C. 154(b) by 159 days.

(21) Appl. No.: 10/423,258

(22) Filed: Apr. 25, 2003

(51) Int. Cl.⁷ .............................................. F21V 33/00
(52) U.S. Cl. ...................... 362/99; 362/197; 362/199; 362/200; 359/799; 359/800
(58) Field of Search .......................... 362/99, 197, 199, 362/200; 359/799, 800

(56) References Cited

U.S. PATENT DOCUMENTS

| | | | | |
|---|---|---|---|---|
| 2,056,693 | A | * | 10/1936 | Stanley ....................... 359/802 |
| 3,945,717 | A | * | 3/1976 | Ryder et al. ................. 359/800 |
| 4,598,340 | A | * | 7/1986 | Dwosh et al. ................ 362/98 |
| 5,379,201 | A | * | 1/1995 | Friedman .................... 362/191 |
| 5,570,275 | A | * | 10/1996 | Luquire ....................... 362/125 |
| 6,015,217 | A | * | 1/2000 | Colangelo et al. .......... 362/103 |
| 6,034,826 | A | * | 3/2000 | Helmecke .................. 359/798 |
| 6,115,328 | A | | 9/2000 | Chan |
| 6,142,644 | A | * | 11/2000 | Leung .......................... 362/98 |
| 6,176,592 | B1 | * | 1/2001 | Kovacik et al. ............ 362/199 |
| 6,178,085 | B1 | | 1/2001 | Leung |
| 6,206,281 | B1 | | 3/2001 | Leung |
| 6,213,618 | B1 | * | 4/2001 | Dobbin et al. ................ 362/99 |
| 6,249,431 | B1 | | 6/2001 | Chan |
| 6,324,557 | B1 | | 11/2001 | Chan |
| 6,443,615 | B1 | * | 9/2002 | Chan .......................... 368/316 |
| 6,508,396 | B1 | | 1/2003 | Chan |
| 6,565,232 | B1 | * | 5/2003 | Goldstein et al. ........... 362/253 |
| 6,582,097 | B2 | * | 6/2003 | Chang ......................... 362/253 |
| 6,634,763 | B1 | * | 10/2003 | Leifer et al. ................. 362/109 |
| 6,736,531 | B2 | * | 5/2004 | Wallach ...................... 362/414 |

* cited by examiner

*Primary Examiner*—Thomas M. Sember
*Assistant Examiner*—Jacob Y. Choi
(74) *Attorney, Agent, or Firm*—Alix, Yale & Ristas, LLP

(57) ABSTRACT

A magnifying apparatus includes a seat, an intermediate member, a first spring-loaded hinge connecting one end of the intermediate member to the seat, a cover, a second spring-loaded hinge connecting an opposite end of the intermediate member to the seat, a catch provided at the seat for grasping the cover at a closed configuration of the apparatus and releasing the cover and the intermediate member from the closed configuration of the apparatus for movement to an open configuration by the action of the spring-loaded hinges. There is a movable light emitter at the seat having a first configuration for illuminating an object in a space defined by the seat, intermediate member and cover at the open configuration, and a second configuration for illuminating a remote object.

9 Claims, 8 Drawing Sheets

HINGEDLY ARTICULATED MAGNIFYING DEVICE

BACKGROUND OF THE INVENTION

The present invention relates to a hingedly articulated magnifying device. More particularly, although not exclusively, the invention relates to such a magnifying device having spring-loaded dampened hinges connecting an intermediate member to a seat and a cover. The intermediate member includes a magnifying lens and the seat includes a light that can be reconfigured to shine toward a remote object or toward an object located in a space defined by the seat, intermediate member and cover.

It is known to provide fold-down magnifying devices. Such devices include a support seat from which an intermediate member pivots upon a hinge and from which there is hinged a magnifying lens panel. However, where one might desire to view articles in a dark environment, illumination of the article can present problems.

OBJECTS OF THE INVENTION

It is the object of the present invention to provide an improved articulated magnifying device having a light emitter for illuminating an object in a space defined by its opened segments in one configuration, and which can illuminate a remote object in another consideration.

DISCLOSURE OF THE INVENTION

There is disclosed herein an apparatus comprising:
a seat;
an intermediate member;
a first spring-loaded hinge connecting one end of the intermediate member to the seat;
a cover;
a second spring-loaded hinge connecting an opposite end of the intermediate member to the seat;
a catch provided at the seat for grasping the cover at a closed configuration of the apparatus and releasing the cover and the intermediate member from the closed configuration of the apparatus for movement to an open configuration thereof by the action of the spring-loaded hinges; and
a movable light emitter at the seat and having a first configuration for illuminating an object in a space defined by the seat, intermediate member and cover at the open configuration, and a second configuration for illuminating a remote object.

Preferably the intermediate member comprises a magnifying lens.

Preferably the hinges each comprise a tube connected by a shaft.

Preferably the shaft connects to a coil spring located within the tube.

Preferably the seat, intermediate member and cover together form an arc shape in the open configuration to define the space for illuminating an object to be viewed through the magnifying lens.

Preferably the light emitter has associated with it a drive mechanism connected to the first hinge so that the light emitter moves from the first position to the second position in response to the action of the hinges.

Preferably the cover encases the intermediate member in the closed configuration.

Preferably the catch is attached pivotally to the seat and comprises a lip that engages with an edge of the cover.

Preferably the apparatus further comprises a compartment in the seat for receiving battery cells 23 to supply power to the light emitter.

Preferably the apparatus further comprises a mechanical switch at the seat for moving the light emitter.

BRIEF DESCRIPTION OF THE DRAWINGS

A preferred form of the present invention will now be described by way of example with reference to the accompanying drawings, wherein.

DESCRIPTION OF THE PREFERRED EMBODIMENT

Figure 1:
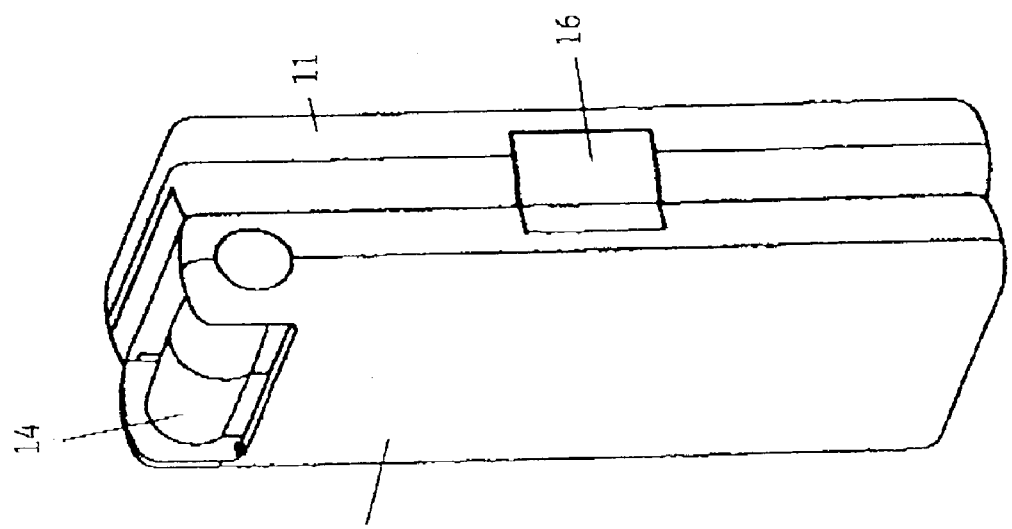
FIG. 1 is a schematic perspective illustration of a hingedly articulated magnifying device in a closed configuration.
Figure 2:
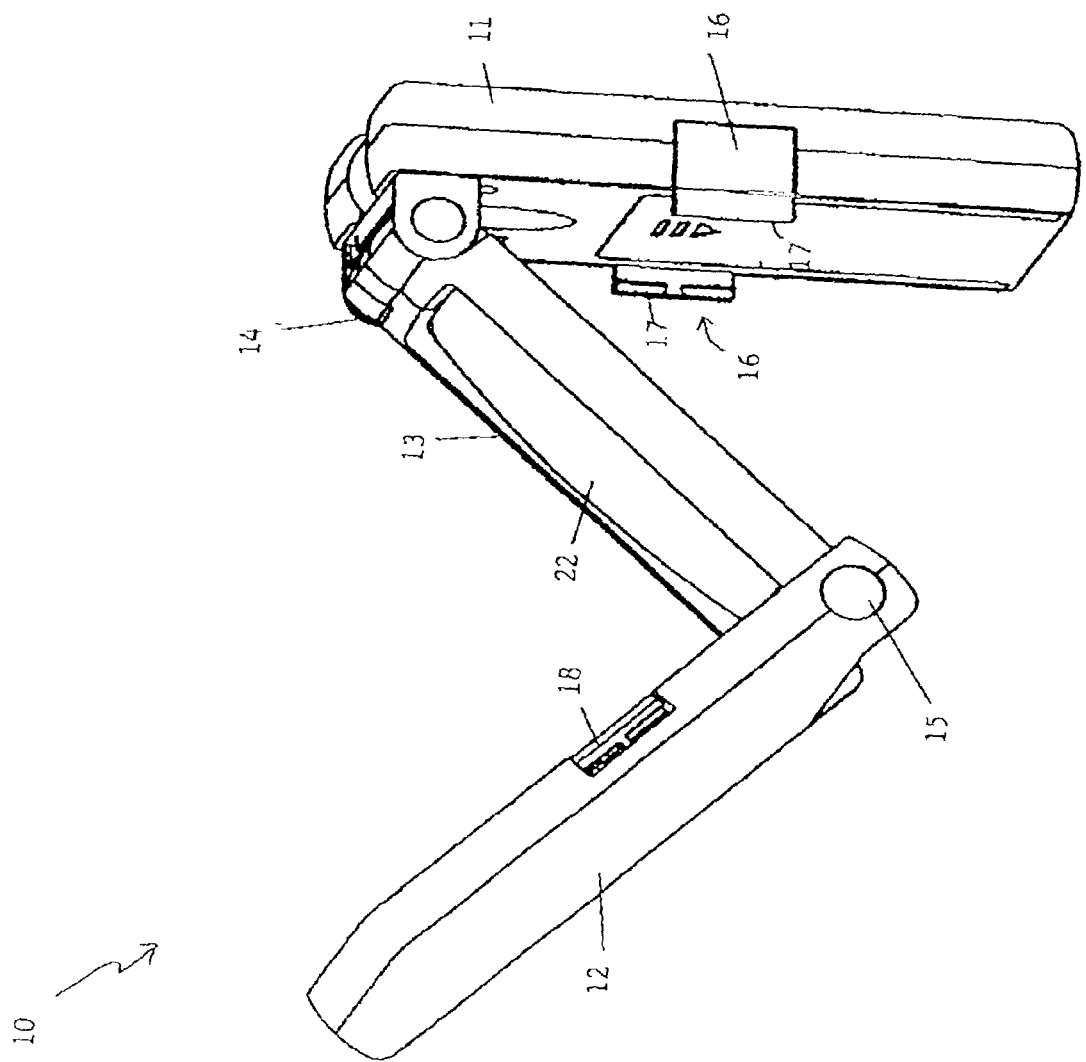
FIG. 2 is a schematic perspective illustration of the device of FIG. 1 in a partially opened configuration.

In the accompanying drawings there is depicted schematically a display magnifying device 10. Device 10 is typically fabricated from moulded plastics material, but might alternatively be formed of machined aluminium, brass or stainless-steel for example.

The devise 10 includes a seat 11 upon which there sits a cover 12. Articulating the cover 12 to the seat 11 is an intermediate member 13.

A hinge 14 attaches the intermediate member 13 to the seat 11. Another hinge 15 attaches the cover 12 to the intermediate member 13.

Each hinge 14, 15 is of the type disclosed in the applicant's co-pending U.S. patent application Ser. No. 10/321,024, the content of which is incorporated herein by cross-reference.

There is a pair of catches 16 assembled upon the seat 11. Each catch 16 includes opposed lips 17 to be received by shoulders 18 of the seat cover 12. Each catch 16 includes pivot pins 19 by which the catches are pivotally amounted to be seat 11. A spring (not shown) is fitted upon a boss 20 to bias the catch 16 into a position wherein the lip 17 extend over the shoulders 18 to thereby retain the device in a closed position against the bias of the springs 21 in each of the hinges 14 and 15. In order to release the intermediate member 13 and cover 12, finger pressure is applied to the catches 16 to release the lips 17 from the shoulders 18.

There is a magnifying lens 22 in the intermediate member 13. This lens is protected by the cover 12 and is housed adjacent to the seat 11 when the device is in the closed configuration as depicted in FIG. 1.

Figure 3:
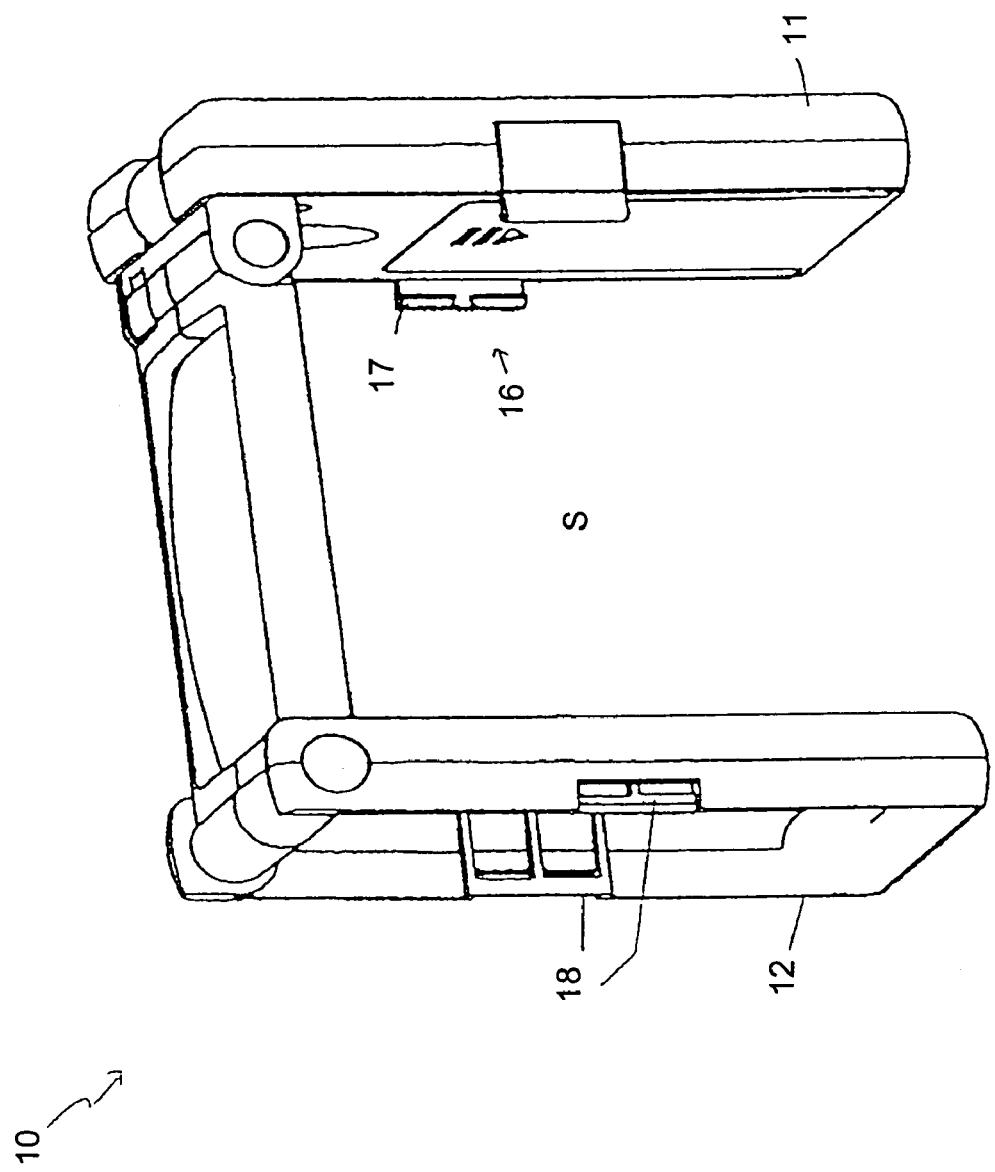
FIG. 3 is a schematic perspective illustration of the device of Figure is 1 and 2 in a fully opened configuration.
Figure 4:
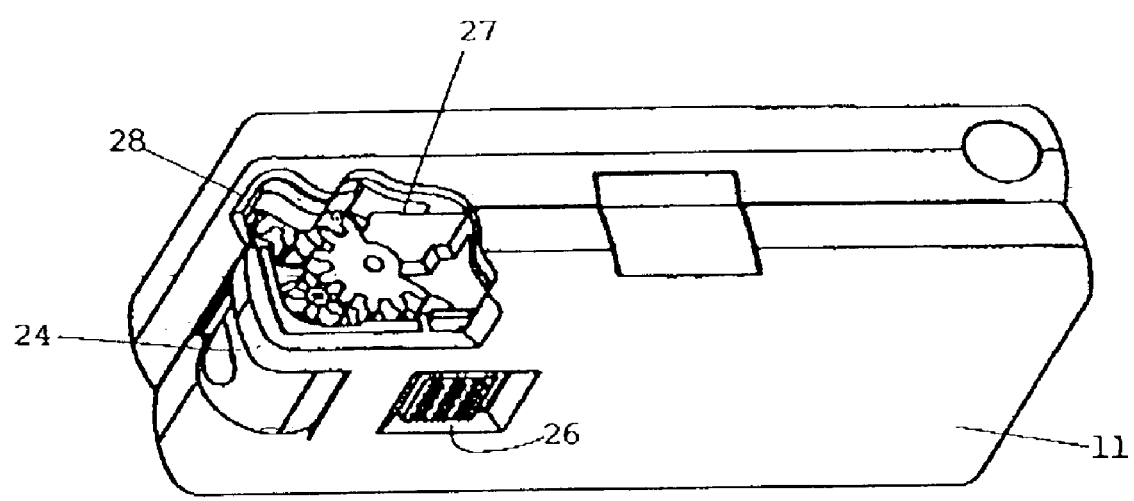
FIG. 4 is a schematic perspective partially cut-away illustration of the device in the FIG. 1-configuration.
Figure 5:
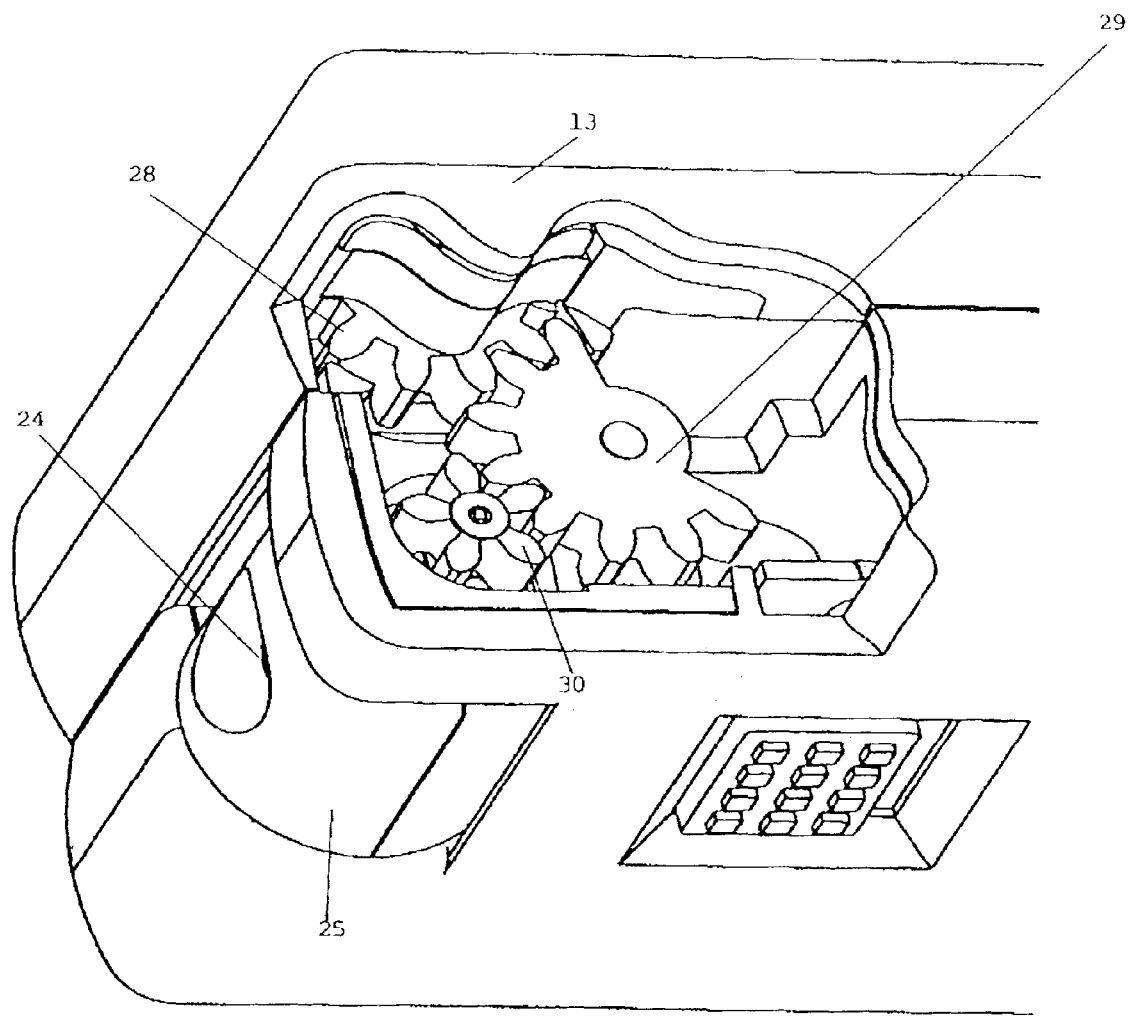
FIG. 5 is a detailed schematic perspective illustration of the cut-away portion of FIG. 4.
Figure 6:
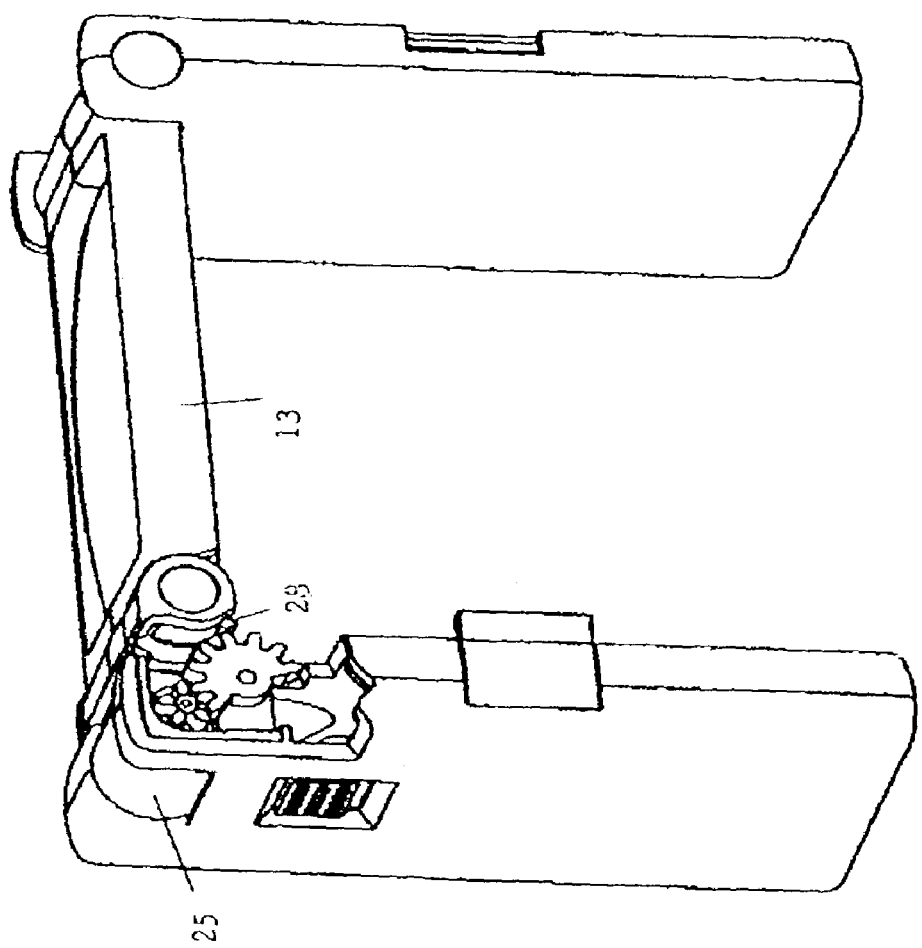
FIG. 6 is a schematic perspective partially cut-away illustration of the device in the configuration of FIG. 3.
Figure 7:
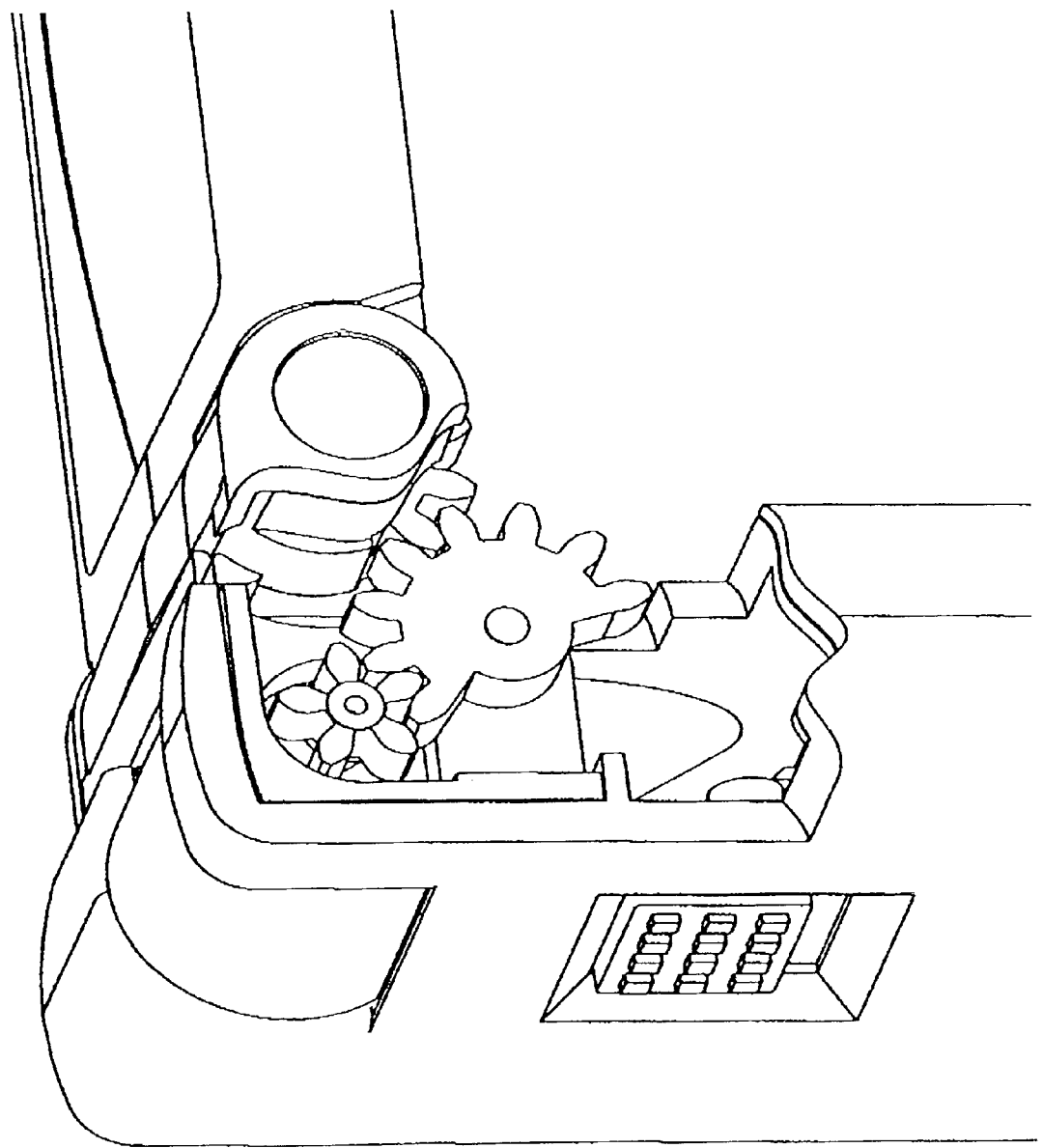
FIG. 7 is a detailed schematic perspective illustration of the cut-away portion of FIG. 6.
Figure 8:
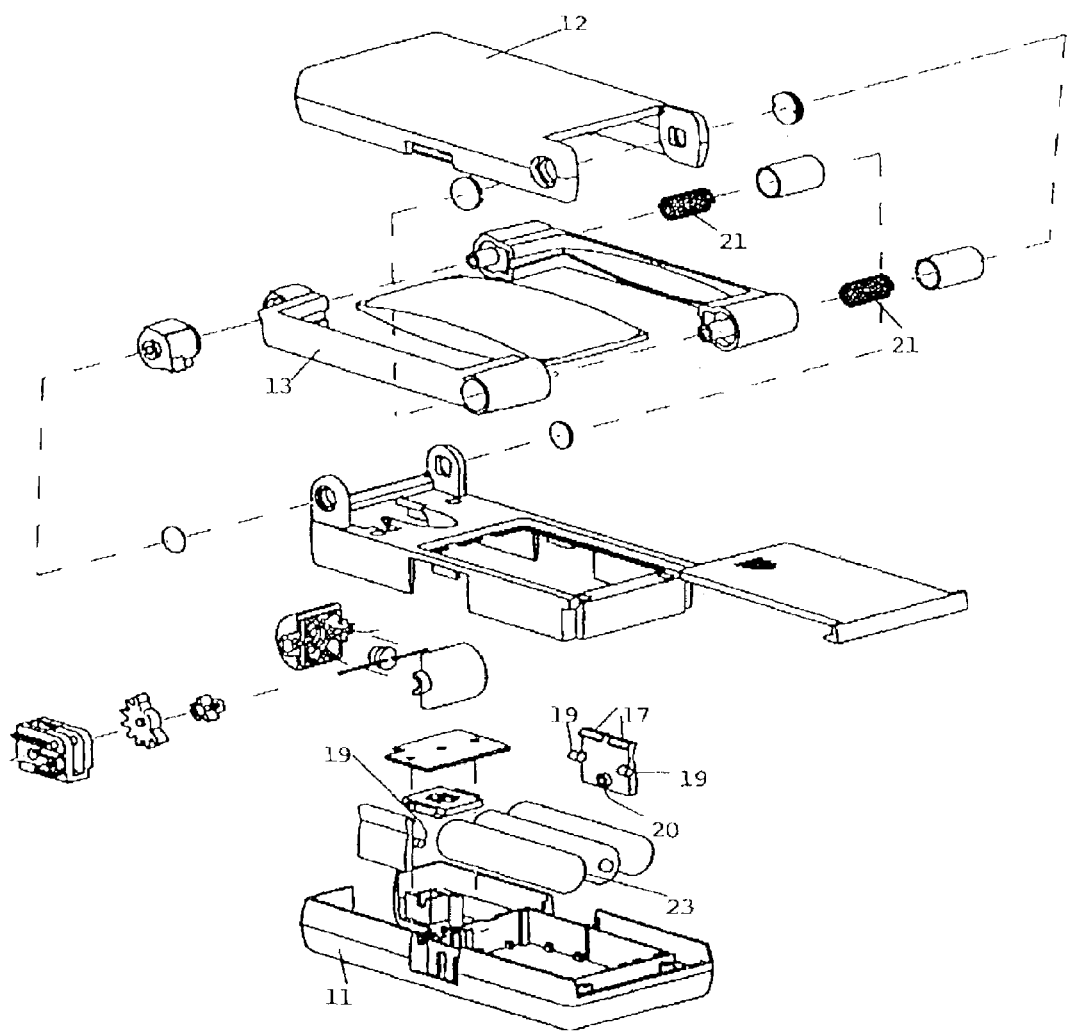
FIG. 8 is a schematic parts-exploded perspective illustration of the device of Figure is 1 to 7.

A number of battery cells 23 are housed within the seat 11 and serve to power a light emitter 24 that is located at hinge 14. The light emitter comprises a barrel 25 mounted pivotally to the seat 11 at its ends. The light emitter 24 can be redirected upon pivotal movement of the barrel 25 within which it is fixed. In one configuration, the light emitter 24 can shine into the space S defined by the seat 11, intermediate member 13 and cover 12 in the open configuration as depicted in FIG. 3. On the other hand, the light emitter can point away from the article so that it can be used as a flashlight as shown in FIG. 4. There is an on-off switch 26 for closing or opening an electrical circuit between the battery cells 23 and the light emitter 24.

There is a gearbox 27 within the seat 11 and extending to the hinge 14. This comprises a drive gear 28 fixed with respect to the intermediate member 13. There is a driven gear 29 mounted pivotally to the seat 11 that engages with the fixed drive gear 28 upon pivotal movement of the intermediate member 13 with respect to the seat 11. Pivotal movement of the driven gear 29 effects rotation of a pinion 30 that is rotationally fixed with respect to the drum 25. That is, upon pivotal movement of the intermediate member 11, the driven gear 29 pivots to rotate the pinion 30 and barrel 25 to redirect the light emitter 24. This ensures that the light emitter points to the space S when the apparatus takes on the open configuration of FIG. 3 and that the light emitter points away toward any remote object when the apparatus is closed.

It should be appreciated that modifications and alterations obvious to those skilled in the art are not to be considered as beyond the scope of the present invention. For example, the magnifying lens might be formed as part of the cover instead of the intermediate member. Also, instead of providing a separate electrical switch 26, there might be a switch activatable upon pivotal movement of the cover and/or intermediate member with respect to the seat.

What is claimed is:

1. Apparatus comprising:
   a seat;
   an intermediate member comprising a magnifying lens;
   a first spring-loaded hinge connecting one end of the intermediate member to the seat;
   a cover;
   a second spring-loaded hinge connecting an opposite end of the intermediate member to the seat;
   a catch provided at the seat for grasping the cover at a closed configuration of the apparatus and releasing the cover and the intermediate member from the closed configuration of the apparatus for movement to an open configuration thereof by the action of the spring-loaded hinges; and
   a movable light emitter at the seat and having a first configuration for illuminating an object in a space defined by the seat, intermediate member and cover at the open configuration, and a second configuration for illuminating a remote object.

2. The apparatus of claim 1 wherein the hinges each comprise a tube connected by a shaft.

3. The apparatus of claim 2 wherein the shaft connects to a coil spring located within the tube.

4. The apparatus of claim 1 wherein the seat, intermediate member and cover together form an arc shape in the open configuration to define the space for illuminating an object to be viewed through the magnifying lens.

5. The apparatus of claim 1 wherein the light emitter comprises a drive mechanism connected to the first hinge so that the light emitter moves from the first position to the second position in response to the action of the hinges.

6. The apparatus of claim 1 wherein the cover encases the intermediate member in the closed configuration.

7. The apparatus of claim 1 wherein the catch is attached pivotally to the seat and comprises a lip that engages with an edge of the cover.

8. The apparatus of claim 1 further comprising a compartment with a cover in the seat for receiving battery cells to supply power to the light emitter, said battery cells being located behind the cover.

9. The apparatus of claim 1 further comprising a mechanical switch at the seat for moving the light emitter.

* * * * *